United States Patent
Hyman et al.

(10) Patent No.: US 6,772,395 B1
(45) Date of Patent: Aug. 3, 2004

(54) SELF-MODIFYING DATA FLOW EXECUTION ARCHITECTURE

(75) Inventors: Michael I. Hyman, Seattle, WA (US); Phani K. Vaddadi, Issaquah, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/495,757

(22) Filed: Feb. 1, 2000

(51) Int. Cl.$^7$ .......................... G06F 17/00; G06F 17/21
(52) U.S. Cl. .................. 715/513; 715/523; 715/522
(58) Field of Search ................................. 715/523, 522, 715/513, 530; 709/203, 217, 219

(56) References Cited

U.S. PATENT DOCUMENTS

| | | | |
|---|---|---|---|
| 5,928,323 A | * | 7/1999 | Gosling et al. ............. 709/203 |
| 6,012,098 A | * | 1/2000 | Bayeh et al. ............... 709/246 |
| 6,119,149 A | * | 9/2000 | Notani ........................ 709/205 |
| 6,356,920 B1 | * | 3/2002 | Vandersluis ............... 715/501.1 |
| 6,535,896 B2 | * | 3/2003 | Britton et al. .............. 707/523 |
| 6,643,708 B1 | * | 11/2003 | Francis et al. .............. 709/246 |

OTHER PUBLICATIONS

Aho, Alfred V., Sethi, Ravi, and Jeffrey D. Ullman. Compilers: Principles, Techniques and Tools, 1986, Addiison--Wesley, 1988 Revision, p. 474–475.*

Jon Bosak et al., "XML and the Second–Generation Web", Scientific America, 1999.

"Extensible Markup Language (XML) 1.0—W3C Recommendation Feb. 10, 1998", edited by Tim Bray, Jean Paoli and C.M. Spersberg–McQueen.

Jeffrey Ricker, "Introduction to XML", XML Solutions, May 15, 1998.

Extensible Stylesheet Language (XSL) Version 1.0—World Wide Web Consortium Working Draft Aug. 18, 1998, edited by James Clark and Stephen Deach.

* cited by examiner

*Primary Examiner*—Stephen S. Hong
*Assistant Examiner*—Jonathan Schlaifer
(74) *Attorney, Agent, or Firm*—Banner & Witcoff, Ltd.

(57) ABSTRACT

A self-modifying data flow architecture for computer-readable structures, such as markup language, is modeled as a network of interconnected processing elements, each having a data input and a transformation input. Each processing element generates output by applying the transformation input to the data input. The output of one processing element may be provided as either a data input or a transformation input to another processing element. The resulting architecture provides a network of interconnected processing elements which are modified dynamically depending on the data flowing through the overall process.

34 Claims, 9 Drawing Sheets

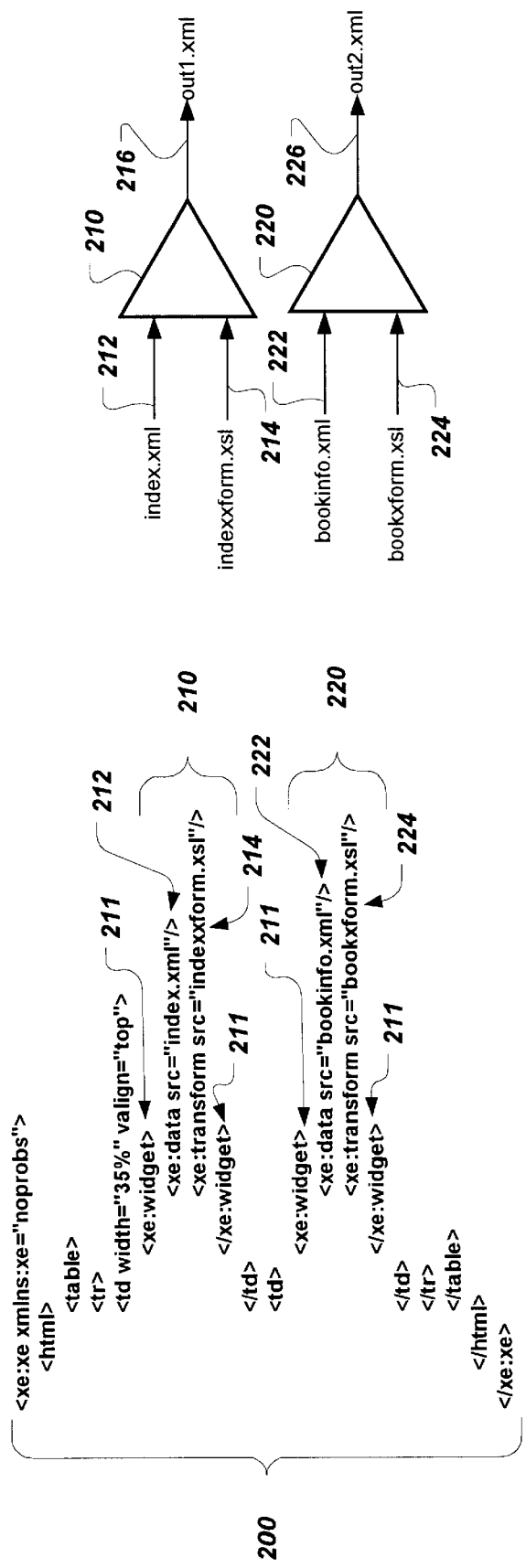

```
<xe:xe xmlns:xe="noprobs">
<html>
<table>
<tr>
<td width="35%" valign="top">
<xe:widget>
<xe:data src="awards.xml"/>
<xe:transform>
<xe:widget>
<xe:data src="awardtemplate.xml"/>
<xe:transform src="bind.xsl"/>
</xe:widget>
</xe:transform>
</xe:widget>
</td>
</tr>
</table>
</html>
</xe:xe>
```

```
<xe:xe xmlns:xe="noprobs">
    <html>
        <xe:widget>
            <xe:data>
                <xe:widget>
                    <xe:data>
                        <records>
                            <record>
                                <apples/>
                                <bananas/>
                            </record>
                            <record>
                                <apples/>
                                <oranges/>
                            </record>
                        </records>
                    </xe:data>
                    <xe:transform src="getdistinct.xsl"/>
                </xe:widget>
            </xe:data>
            <xe:transform src="process.xsl"/>
        </xe:widget>
    </html>
</xe:xe>
```

400, 420, 410

```
<xe:xe xmlns:xe="noprobs">
    <html>
        <xe:widget>
            <xe:data>
                <unique>
                    <apples/>
                    <bananas/>
                    <oranges/>
                </unique>
            </xe:data>
            <xe:transform src="process.xsl"/>
        </xe:widget>
    </html>
</xe:xe>
```

400 — overall block; 440 — `<unique>...</unique>` block

Figure 4C

```
<xe:xe xmlns:xe="noprobs">
    <html>
        <p>
            The data contains:
            <ul>
                <li>apples</li>
                <li>bananas</li>
                <li>oranges</li>
            </ul>
        </p>
    </html>
</xe:xe>
```

Figure 4D

```
<xe:xe xmlns:xe="noprobs">
    <html>
        <xe:widget>
            <xe:data>                                    ⎫ 610
                <unique>
                    <apples xe:message="firstitem"/>
                    <bananas/>
                    <oranges/>
                </unique>
            </xe:data>
            <xe:transform src="process.xsl"/>
        </xe:widget>
    </html>
</xe:xe>
```

```
<xe:xe xmlns:xe="noprobs">
    <html>
        <xe:widget>
            <xe:data>
                <unique xe:message="unique">
                    <apples xe:message="firstitem"/>
                    <bananas xe:message="seconditem"/>
                    <oranges xe:message="firstitem"/>
                </unique>
            </xe:data>
            <xe:transform src="process.xsl"/>
        </xe:widget>
    </html>
</xe:xe>
```

Figure 6B

```
<xe:xe xmlns:xe="noprobs">
    <html>
        <xe:widget>
            <xe:data>
                <unique     xe:message="unique[@ID    $gt$    10]    |
search/unique">
                    <apples/>
                    <bananas/>
                    <oranges/>
                </unique>
            </xe:data>
            <xe:transform src="process.xsl"/>
        </xe:widget>
    </html>
</xe:xe>
```

Figure 6C

SELF-MODIFYING DATA FLOW EXECUTION ARCHITECTURE

TECHNICAL FIELD

The invention relates to architectures for computer-readable structures, such as markup language that represents pages for display on the World Wide Web and to apparatus and methods for parsing such structures. Specifically, the invention relates to processing architectures that are capable of self-modification based on the flow of data within the architecture. The invention also relates to parsers or execution engines for executing structures constructed according to such architectures and to caching systems and authoring tools for such architectures.

BACKGROUND OF THE INVENTION

Web sites, especially those employed in electronic commerce, typically include user interfaces for permitting end users to view and enter information. Importantly, such web sites are frequently based on data, i.e., price listings, product listings, account status, that changes on a regular basis.

Various markup languages for generating Web content are known in the art. Generally, such languages provide a method of formatting text by adding information, typically in the form of tags, to the text of the computer-displayed document to indicate the logical components of the document, the layout of text, or other information that can be interpreted by a computer. One markup language in widespread use is Hypertext Markup Language (HTML). Another known markup language is Extensible Markup Language (XML), which is currently being standardized and will likely be widely adopted.

Both HTML and XML are really just reflections of a broader markup language known as Standard Generalized Markup Language. Both XML and HTML contain markup symbols to describe the contents of a page or file. HTML describes content, i.e., text and graphic images, only in terms of how content is to be displayed and interacted with. For example, the tag <P> starts a new paragraph. On the other hand, XML describes the content in terms of what kind of data it is. For example, a tag such as <ADDRESS> might indicate that the data that followed it is an address. As XML tags proliferate across the Internet, the ability to search Web documents and to manipulate data contained in Web documents will be enhanced.

Thus, an XML file can be processed purely as data by a program, or it can be displayed. For example, depending on how the application in a receiving computer processed the data tagged by <ADDRESS>, the actual data could be stored, displayed or retrieved by a search routine searching for address data. XML is considered an "extensible" language because, unlike HTML, the markup symbols are unlimited and self-defining. XML is actually a simpler and easier-to-use subset of SGML, yet, because of its self-describing features, it is much more powerful than HTML. It is expected that HTML and XML will be used together in many Web applications.

Current solutions for creating layout for Web pages are code-intensive. When the data changes, web page authors must typically modify the coding that represents the layout. There have been efforts to provide web-authoring tools which reduce the effort involved in creating layout. Conventional web-authoring tools seek to provide a way for web developers to create layout quickly by utilizing a series of templates for portions of a page. For example, "FRONTPAGE," developed by Microsoft Corporation of Redmond, Wash., provides wizards to construct layout to map to data. However, this is an author time solution and requires that the wizard examine the data and determine the layout when the web page is authored. Another tool, known as "VISUAL INTERDEV," also developed by Microsoft Corporation of Redmond, Wash., uses design time controls which cause other controls to be instantiated at runtime, the latter controls being able to respond to changing data. However, these controls are very procedurally focused and the controls are instantiated by code that executes at a particular time in a control sequence. The procedural focus of such controls permits only limited flexibility in responding to changing data.

It would therefore be advantageous to provide an execution architecture for computer-readable structures, such as markup language, which provides for dynamic mapping of data to layout such that a web developer may create layout which is self-modifying based on the data source. Such an execution architecture would eliminate the need for manual modification of layout when data changes.

Current architectures also suffer from the disadvantage of inefficient caching. Typically, pages are divided into regions, with each region providing interaction with a user via mouse clicks, data entry, etc. When page regions or data associated with a particular region changes, the entire page is typically regenerated even though other regions typically remain unchanged. Under current architectures, it is difficult or impossible to perform dependency analysis on the page layout to determine which regions are unaffected by a change in a given page region or date. Thus, regeneration of the entire page is a measure to ensure that all regions are properly updated. However, regeneration of the entire page often unnecessarily results in increased use of resources and bandwidth. Thus, it would be advantageous to provide an architecture which lends itself to dependency analysis and therefore provides for efficient caching.

Another disadvantage of known architectures is that they do not allow designers of user interfaces to create display processes which automatically map to data that is passed to them. For example, when a designer creates a multicolumn table in HTML, with different shading for alternate rows, the coding for this layout must be done manually and must be modified if the data to be displayed in the table changes. Moreover, coding for layout involving changes in the number of columns in a table tends to be much more involved than coding involving changes in the number of rows of a table. It would therefore be advantageous to provide an architecture that includes generic processing elements that are capable of automatically mapping data passed to them. Current authoring tools typically provide users with property lists for the display components. For example, "VISUAL BASIC," developed by Microsoft Corporation of Redmond, Wash., provides a property list for any control. Most HTML editors provide property lists for the low-level user interface intrinsics. However, such property lists to date, are not created for generic segments of XML. It would therefore be advantageous to provide an architecture that includes generic processing elements for which a property set may be exposed to permit the use of a familiar tool approach for web page authoring.

SUMMARY OF THE INVENTION

The aforementioned problems are addressed by the invention, which provides an execution architecture for computer-readable structures, such as markup language, which is based on data flow rather than execution control flow. The invention contemplates a data-centric architecture in which an overall process for generating markup language is modeled as a network of interconnected processing elements, each having a data input and a transformation input. The transformation input. represents a transformation that is applied to the data input. Each processing element generates output by applying the transformation input to the data input. According to the invention, the output of one processing element may be provided as either a data input or a transformation input to another processing element. The resulting architecture thus provides a network of interconnected processing elements which are modified dynamically depending on data flow. Regions of a web page are represented by top-level processing elements, which may have defined within them other processing elements wired to obtain a particular self-modifying process based on the data flow.

An exemplary implementation of the architecture according to the invention includes a network of processing elements defined by an XML tree. An XML input tree structure is used to define the data flow relationships between processing elements. Within the input tree, processing elements are defined by appropriate tags, recognized by an execution engine according to another aspect of the invention. Transformation input elements, according to this exemplary implementation, are provided in the form of XSL trees, and data input elements are provided in the form of XML trees. Each processing element therefore generates an output tree, in the form of an XML tree, which is constructed by applying the XSL transformation input to the XML data input. Nesting of processing elements within the input tree provides for the use of an output tree of one processing element as an input to another processing element.

According to another aspect of the invention, a message bus is implemented within the architecture. Each processing element within the input tree may be provided with one or more queries to the message bus, which specifies services to the processing elements in the network. When a particular message query finds a matching message on the message bus, the matching message tree replaces the input node in that particular processing element. In this way, a loose handshake is provided between the services specified on the message bus and the processing elements. Messaging thus provides a way to dynamically alter the characteristics of one or more processing elements based on specific services conveyed to the processing element network.

An execution engine for parsing a structure defined according to the invention is provided with appropriate instructions for recognizing processing elements and message hookups within the input tree structure. The execution engine parses the input tree structure using depth first traversal, first evaluation the deepest child nodes. Child nodes that are not processing elements are copied to the output tree. If a particular child node is deemed to be a processing element, the execution engine first determines if any message hookups exist on the data input node or transformation input node of the processing element. If message hookups do exist, the tree structure associated with the message being queried are used to replace the tree structure of the corresponding input node. The resulting tree structure is placed in the appropriate position in the output tree. After the deepest child nodes are traversed, the execution engine unwinds the recursion to the next level up, applying the transformation to the output tree on the unwind, and transverses the child nodes at that level, repeating the process of evaluating processing elements and message hookups. The process terminates when the top-level nodes have been unwound.

Another aspect of the invention utilizes XML schemas as an additional tree associated with each processing element. These XML schemas provide descriptions of the expected format of the input and transformation trees for a particular processing element. They also provide descriptions of the expected output of the processing element and may describe particular methods available with respect to the processing element. These schemas, since they are described themselves in XML, may be examined by the execution engine and by authoring tools for intelligently creating relationships between processing entities.

Yet another advantage of the invention is efficient caching of data or page regions. The declarative nature of the data tree, transformation tree, message tree and processing element output trees, provides for efficient dependency analysis on the architecture to determine which processing elements must be reevaluated upon a change in data, transformation input or messages. Specifically, after an architecture is evaluated for the first time, a cache may be provided for storing the evaluation of each individual processing element. Upon a change in data, messages, or transformation input, the reevaluation of particular processing elements can be controlled based on the dependency analysis, thus avoiding the unnecessary reevaluation of processing elements which have not changed.

BRIEF DESCRIPTION OF THE DRAWINGS

The present invention is illustrated by way of example in the accompanying Figures, which should not be construed as limiting, in which:

FIG. 2A illustrates an exemplary markup language implementation of two processing elements in an architecture according to the invention;

FIG. 2B is a functional block diagram of the implementation of FIG. 2A;

FIG. 4C is a markup language result after evaluation of the markup language of FIG. 4A by an execution engine according to the invention;

FIG. 4D is a markup language result after further evaluation of the markup language of FIG. 4C by an execution engine according to the invention;

FIG. 5 is a functional block diagram of an exemplary messaging architecture according to the invention;

FIGS. 6A–6C are markup language implementations of a messaging architecture according to the invention.

DETAILED DESCRIPTION OF THE INVENTION

Although not required, the invention will be described in the general context of computer-executable instructions, such as program modules, being executed by a personal computer. Generally, program modules include routines, programs, objects, components, data structures, etc., that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 1:
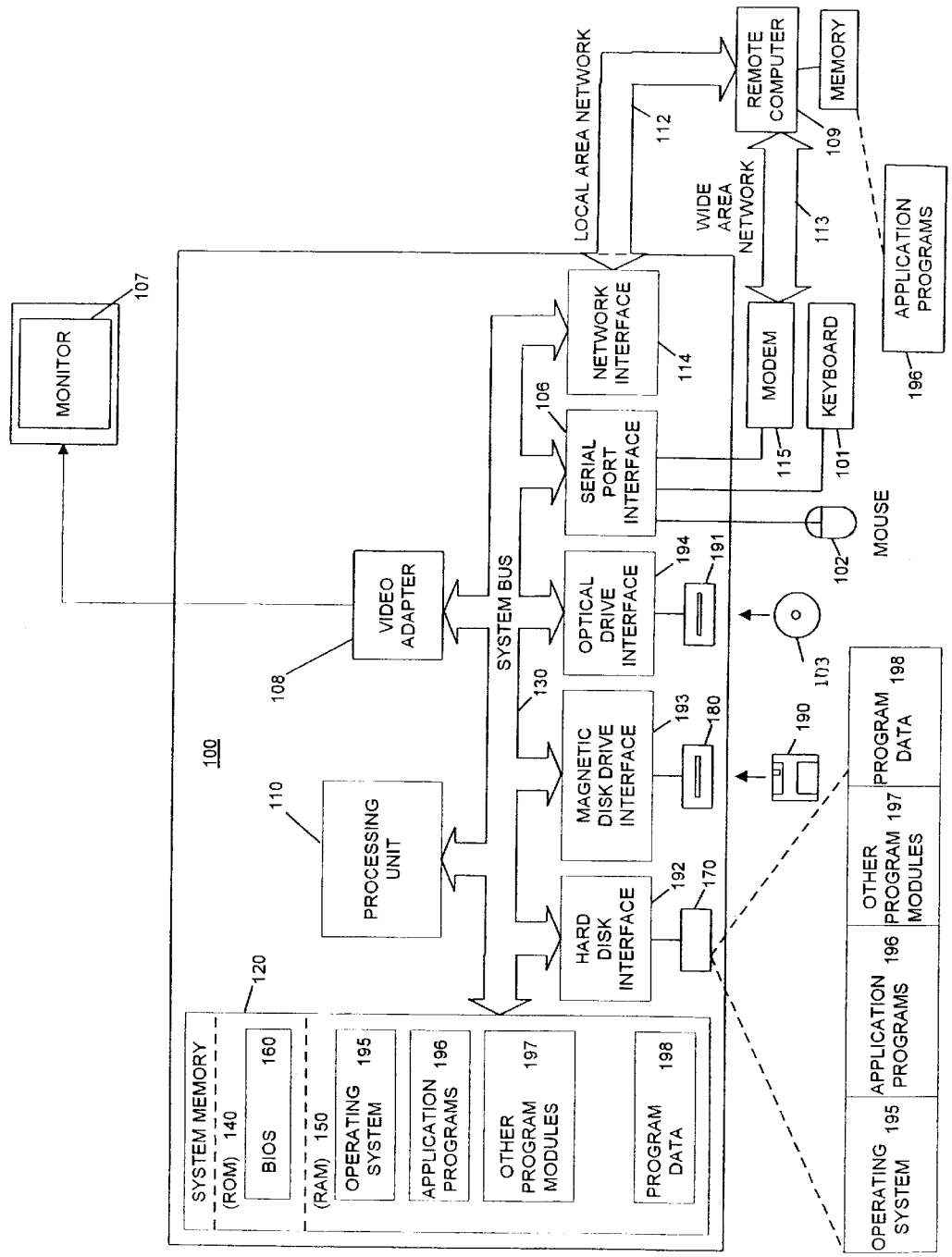
FIG. 1 is a schematic block diagram of a conventional general-purpose digital computing environment that may be used to implement various aspects of the present invention.

FIG. 1 is a schematic diagram of a conventional general-purpose digital computing environment that can be used to implement various aspects of the invention. FIG. 1 and the following discussion are intended to provide a brief, general description of a suitable computing environment in which the invention may be implemented.

With reference to FIG. 1, an exemplary system for implementing the invention includes a general purpose computing device in the form of a conventional personal computer 100, having a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory includes read only memory (ROM) 140 and random access memory (RAM) 150. A basic input/output system 160 (BIOS), containing the basic routines that helps to transfer information between elements within the personal computer 100, such as during start-up, is stored in ROM 140.

The personal computer 100 further includes a hard disk drive 170 for reading from and writing to a hard disk (not shown). Also included are a magnetic disk drive 180 for reading from or writing to a removable magnetic disk 180, and an optical disk drive 191 for reading from or writing to a removable optical disk 103 such as a CD-ROM or other optical media. The hard disk drive 170, magnetic disk drive 180, and optical disk drive 191 are connected to the system bus 130 by a hard disk drive interface 192, a magnetic disk drive interface 193, and an optical drive interface 194, respectively. The drives and their associated computer-readable media provide nonvolatile storage of computer readable instructions, data structures, program modules and other data for the personal computer 100. Although the exemplary environment describes herein employs a hard disk 170, a removable magnetic disk 190 and a removable optical disk 103, it should be appreciated by those skilled in the art that other types of computer-readable media are contemplated by the invention. For example, media which can store data that is accessible by a computer, such as magnetic cassettes, flash memory cards, digital versatile disks, Bernoulli cartridges, random access memories (RAMs), read only memories (ROM), and the like, may also be used in the exemplary operating environment.

A number of program modules may be stored on the hard disk, magnetic disk 190, optical disk 192, ROM 140 or RAM 150, including an operating system 195, one or more application programs 196, other program modules 197, and program data 198. A user may enter commands and information into the personal computer 100 through input devices such as a keyboard 101 and pointing device 102. Other input devices (not shown) may include a microphone, joystick, game pad, satellite dish, scanner, or the like. These and other input devices are often connected to the processing unit. 110 through a serial port interface 106 that is coupled to the system bus, but may be connected by other interfaces, such as a parallel port, game port or a universal serial bus (USB). A monitor 107 or other type of display device is also connected to the system bus 130 via an interface, such as a video adapter 108. In addition to the monitor and speakers, personal computers typically include other peripheral output devices (not shown), such as printers.

The personal computer 100 may operate in a networked environment using logical connections to one or more remote computers, such as remote computer 109. Each remote computer 109 may be another personal computer, a server, a router, a network PC, a peer device or other common network node, and typically includes many or all of the elements described above relative to the personal computer 100, although only a memory storage device 150 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the personal computer 100 is connected to the local area network 112 through a network interface or adapter 114. When used in a WAN networking environment, the personal computer 100 typically includes a modem 115 or other means for establishing communications over WAN 113. The modem 115, which may be internal or external, is connected to the system bus 130 via the serial port interface 106. In a networked environment, program modules depicted relative to the personal computer 100, or portions thereof, may be stored in the remote memory storage device. It will be appreciated that the network connections shown are exemplary and other means of establishing a communications link between the computers can be used. The existence of any of various well-known protocols, such as TCP/IP, Ethernet, FTP, HTTP and the like, is presumed, and the system can be operated in a client-server configuration to permit a user to retrieve web pages from a web-based server. Any of various conventional web browsers can be used to display and manipulate data on web pages.

FIG. 2A illustrates an exemplary markup language implementation of two processing elements in an architecture according to the invention. The exemplary implementation is written in XML. Although the various implementations described herein are coded in XML, it will be apparent to those of ordinary skill that the invention contemplates other codes and languages, including C and its derivatives, SQL, or Java.

An exemplary XML tree 200 includes two processing elements 210 and 220 defined therein. Each processing element 210 and 220 is denoted by appropriate processor element tags 211. In this exemplary implementation, the tag set <xe:widget> and </xe:widget> is used to delimit processing elements. Each processing element includes a data input and a transformation input. Processing element 210 includes data input 212 denoted by <xe:data src="index.xml"/>, which is a reference to an XML data tree, that, in an exemplary case, has the following content:

```
<data>
    <item>
        <fiie>item1.htm</file>
        <description>First item</description>
        <author>Michael</author>
    </item>
    <item>
        <file>item2.htm</file>
        <description>Second item</description>
        <author>Phani</author>
    </item>
</data>
```

A powerful tool for formatting XML documents is Extensible Stylesheet Language (XSL). XSL essentially provides a series of templates that can be used to match some aspect of an XML document, usually by matching defined units, or nodes, in the document. These templates apply patterns to the input XML stream that transform it to an output stream. Importantly, XSL contains a number of functions for making conditional comparisons, sorting, and performing group operations, and thus provides, among other things, a way to transform the order in which elements appear in the input document. Also importantly, XSL is written in XML itself. Thus, transformations may be performed on XSL and the same parser that manipulates XML data can also, with appropriate XSL processing features, reference, retrieve, and manipulate the XSL. XSL is thus a transformational language. It can take an XML document (or a rigorously valid HTML document) and convert it to another XML document, an HTML document, a printable HTML document, a standard ASCII text file, a proprietary text format, or conceivably even a binary representation.

Processing element 210 also includes a transformation input 214,which in this exemplary case is a reference, <xe:transform src="indexxform.xsl"/> to an XSL tree which has the following content:

```
<transform>
<xsl:template xmins:xsl="uri:xsl">
<xsl:for-each select="item">
    <a><xsl:attribute
    name="href"><xsl:value-of select="file"/></xsl:attribute>
    <xsl:value-of select="description"/></a>
</xsl:for-each>
</xsl:template>
</transform>
```

A set of HTML tags are included in the XML tree 200. The structure of the input XML tree 200 is important for reasons that will be later described with respect to an exemplary execution engine according to the invention. The execution engine will process the input XML tree 200 to create an output tree. As will be described in more detail below, during the execution process, tags which do not define processing elements 210 or 220 are copied directly to the output tree, preserving the order and structure of the input tree.

FIG. 2B is a functional block diagram of the implementation of FIG. 2A. Each processing element 210 and 210 may be represented by a symbol which is provided with a data input 212, 222 and a transformation input 214, 224. Each processing element 210, 220 generates a respective output 216 and 226.

Figure 2C:
FIG. 2C is an exemplary output generated by the processing elements of FIGS. 2A and 2B

FIG. 2C is an exemplary output generated from the input tree 200 of FIGS. 2A and 2B. As the execution engine parses the input tree structure, when a processing element 210 or 220 is encountered, the engine places the respective output "out1.xml" and "out2.xml" in the appropriate position in the output tree 230. Thus, the output 216 corresponds to the XML data in "index.xml" expressed through the transformation defined by "indexxform.xsl." Similarly, the output 226 corresponds to the XML data in "bookinfo.xml" expressed through the transformation defined by "bookxform.xsl." The exemplary input tree of FIG. 2A–2C is useful to introduce the general operation of the processing elements according to the invention. Notably, each of the processing elements 210 and 220 are top-level processing elements, in that they each typically would represent a region of an HTML page.

Figures 3A, 3B:
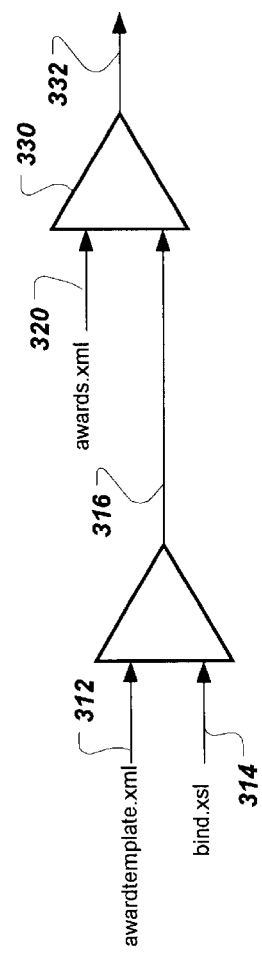
FIG. 3A illustrates a second exemplary markup language implementation of an architecture according to the invention.
FIG. 3B is a functional block diagram of the implementation of FIG. 3A.

FIGS. 3A and 3B illustrate the self-modifying aspects of an exemplary architecture according to the invention. Here, the output 316 of one processing element 310 is wired to as the transformation input of another processing element 330. The wiring structure represented in FIG. 3B is accomplished through the structure of the input tree or node 300 shown in FIG. 3A. The upper level; processing element 330 includes a child processing element or node 310 defined therein. Child processing element 310 is provided with a data input 312 which references an XML file such as "awardtemplate.xrnl," an exemplary listing of which is provided in the APPENDIX to this specification. Child processing element 310 is also provided with a transformation input 316 which references an XSL file such as "bind.xsl," an exemplary listing of which is also provided in the APPENDIX to this specification. For example, bind.xsl is a style sheet that converts an XML file into a form that can be used for the processing input in the tree. In this specific case, it converts a meta-language into XSL for further use throughout the processing. Those of ordinary skill in the art will recognize that the code listing for bind.xsl is just one example of code that could be used to convert a meta language into XSL.

Child processing element 310 is bounded by transformation input tags 311, which indicate that the output of child processing element 310 provides the transformation tree for the upper level processing element 330. The data input 320 for the upper level processing element 330 is provided by reference to "awards.xml" which includes the following tree structure:

```
<data>
<award>
    <name>BN Discover</name>
    <search><<;search>; BND.xml<;/search>; </search>
</award>
<award>
    <name>American Book Awards</name>
    <search><;search>;BND.xml<<;/search>;
    <;xform>;abatemplate.xml<;/xform>;</search>
</award>
<award>
    <name>Booker Prize</name>
    <search><;inactive>;ABA.xml<;/inactive>;</search>
</award>
<award>
    <name>National Book Awards</name>
    <search><; inactive>;NBA.xml<;/inactive>; </search>
</award>
<award>
    <name>Nobel Prize</name>
    <search><; inactive>; nobel.xml<;/inactive>; </search>
</award>
</data>
```

Figures 4A, 4B:
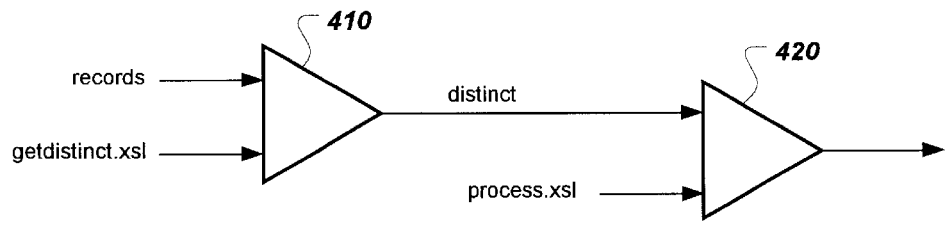
FIG. 4A illustrates a third exemplary markup language implementation of an architecture according to the invention.
FIG. 4B is a functional block diagram of the implementation of FIG. 4A.

The data flow reflected in the tree structure in FIG. 3A is illustrated in FIG. 3B. In processing the input tree 300, an exemplary execution engine according to the invention, as will be described below, first evaluates the inner most processing element 310. The results of this evaluation are placed in the output tree. If the engine recognizes that another processing element, here 330, contains the inner processing element 310, then the results of the evaluation of the inner processing element are processed by the engine as part of the input tree, using recursive techniques. This evaluation process is further illustrated with reference to FIGS. 4A–4D. FIG. 4A illustrates an input tree 400 containing nested processing element 410. Processing element 410 is nested within the data input of the top-level processing element 420 and includes a transformation input "getdistinct.xsl" which accomplishes the function of transforming an input tree of elements into an output tree of distinct elements, i.e., repetitions in the input data are eliminated. As will be recognized by those of ordinary skill, the transformation input "getdistinct.xsl" may involve conventional methods for determining distinct elements from an input set. For example, one approach for collecting distinct elements would involve sorting the input tree by element name, setting a variable representing the previous element to null, traversing the tree, emitting elements into the new tree when the current element is not the same as the previous element, setting the previous element to the current element, and setting the current element to the next element in the tree and repeating the process. Top-level processing element 420 includes a transformation input "process.xsl" which creates the HTML for an input data tree. The data flow can be represented schematically as in FIG. 4B.

FIG. 4C illustrates the output tree from processing element 410 after the deepest processing element 410 is evaluated by the execution engine. The output tree 440 is an XML tree which contains a listing of the unique record elements of the data input for processing element 410, delimited by the <unique> and </unique> tags. During the first pass through the input tree, the execution engine copies the input nodes of the top-level processing element 420 into the output tree. Similarly, FIG. 4D illustrates the output tree after the top level processing element 420 is evaluated, where the transformation "process.xsl" provides an HTML layout for the output tree 440.

It will be appreciated by those of ordinary skill that an architecture according to the invention will be characterized by self-modifying aspects related to the use of an output of one processing element as the transformation input of another processing element. As such, each processing element may be modified by an appropriate transform depending on the input data. Thus, the processing that occurs is modified based on the data being processed.

The invention also contemplates processing elements which expose particular schema for permitting authoring tools and services to query the types of information and formats expected by the inputs and outputs of the processing elements. In an XML implementation, the schema for a particular processing element provides a description of the expected format of the input tree and the transform tree and describes any methods available on the processing element. Since the schema is represented in XML itself, it can be examined and processed by the execution engine and by authoring tools. For example, an authoring tool might indicate to a user that one processsing element outputs row names and another processing element expects row names as inputs. The authoring tool could then naturally associate these two processing elements together.

The invention contemplates a mechanism for permitting a user to expose a property set for one or more processing elements. Such a mechanism provides a user interface for presenting the processing elements and associated property sets to a user to enable the user to functionally connect processing elements. According to the invention, such a mechanism first identifies a processing node or element by first traversing through the input tree. Then, the processing node or element is navigated to determine the node's child elements. The child elements are then displayed to the user in a tree format, for example, by constructing an HTML view. Alternatively, the processing node may be examined to determine if it contains an interface schema. If it does, the interface schema is parsed and the information therein is displayed to the user. As an example, the interface schema description could be provided using a formal standard such as the XML Schema proposal or a custom descriptive language, for example, as follows:

```
<schema>
    <comment>Finds the first count items in the database with
a particular color</comment>
    <inputs>
        <item name="color" dt:dt="string" count="1"/>
        <item name="database" dt:dt="string" count="1"/>
        <item name="count" dt:dt="int" count="+"/>
    </inputs>
    <outputs>
        <structure count="*">
            <item name="name" dt:dt="string"/>
            <item name="price" dt:dt="int"/>
        </structure>
    </outputs>
</schema>
```

The invention also contemplates automatic user interface generators. Such user interface generators may employ a technique that would involve the following general steps: First, foreach element in the inputs section, an HTML input field is created. For example, for the above schema, input fields for the "color," "database" and "count" items are created. The resulting created HTML for the user interface would appear as:

<html><body ><form >
    <input name="color" type="text">
    <input name="database" type="text"/>
    <input name="count" type="text"/>
    </form ></body ></html >

Thus, the generated HTML may provide a user interface which will allow the user to enter values for the various inputs to the various widgets.

Furthermore, the invention contemplates tools that may examine the inputs and outputs sections of each of the nodes and create suggested hookups. For example, suppose there were two of the above nodes in the tree. The tool could note that the input "name" in one node might logically receive a value from the output "name" of another node—because they have the same name and type, and that furthermore, the "price" and "count" could be connected because they have the same data type. The "price" and "count" connection would be considered less likely and could be diminished in importance using a variety of known standard UI techniques, because the match is only on type, not on type and name.

Figures 5, 6A:
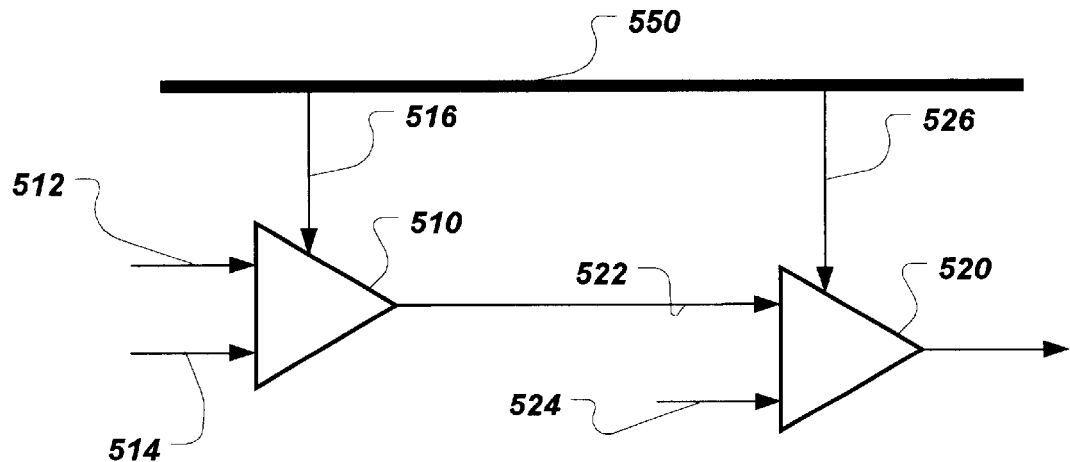

The invention also contemplates an architecture which implements a message bus providing input to the processing elements. Referring to FIG. 5, an exemplary architecture according to the invention may include processing elements 510 and 520, each of which has respective data inputs 512, 522 and respective transformation inputs 514, 524. In addition, message bus inputs 516, 526 are provided on the processing elements for receiving messages sent on the message bus 550.

In an exemplary implementation, the message bus inputs 516 and 526 are provided in the form of queries within the tree defining the processing elements 510, 520. FIG. 6A illustrates an XML tree with a message query 610. In this example, the first element in the "unique" tree will be replaced if there is a message on message bus 550 that matches the query "firstitem." That is, if any element at the root of the message bus is named "firstitem." The message query 610 in this example is provided using XSL pattern syntax. However, it will be recognized by those of ordinary skill that message query 610 could use any query syntax, such as SQL.

It will be recognized that any element in a particular tree may have messages associated with it. FIG. 6B illustrates another exemplary XML tree in which three of the elements within the "unique" element in the data tree have message queries. In this case, two elements, the "apples" and "oranges" elements are associated with the same message query "firstitem," while the other element "bananas" is associated with a different message query "seconditem." Also, the "unique" element itself may be replaced if there is a message matching the query "unique" on the message bus 550. FIG. 6C illustrates another exemplary XML tree with more expressive message queries. In this example, the "unique" tree will be replaced if there is a message with a "unique" element having an identification attribute greater than 10 or if there is a "search" element with a "unique" child.

Those of ordinary skill in the art will recognize that messages may be generated by a variety of different mechanisms. For example, messages may be generated in response to events occurring in a particular system. Messages may be posted to a page on a server or used to establish or preserve state. For example, consider a web page where the customer is placing an order. The server constructs a set of HTML enabling the user to place an order. The user interacts with that HTML and causes a response to be sent to the server. Because the web is by nature a stateless disconnected system, the response sent to the server needs to send a complete set of information enabling the server to reestablish state (the state of placing a specific order for a specific customer). In a similar fashion with the architecture discussed here, the placing of an order can be seen as a message entering the tree. The message can cause some type of execution. The message can also have enough information passed with it to indicate the name of the user, the order being placed, how it relates to previous order processing and so forth, so that the execution tree can reestablish a previous condition.

The exemplary messaging described above permits dynamic modifications to the overall process defined by the processing elements in a particular tree. For example, the data source may be changed based on messages that are generated on the message bus 550 in response to particular user actions, i.e., mouse clicks, on a user interface.

It will also be recognized that messaging by the invention represents a loose "handshake" in which the message specifies services and the processing elements may select which services to respond to based on the way the processing element is configured for messaging. This contrasts sharply with known "tight handshake" mechanisms such as RPC (Remote Procedure Calls) in which one program can request a service from a program located in another computer in a network without having to understand network details. The messaging employed by RPC's, however, requires that a globally unique identifier target be specified and thus, the message specifies a specific method on a specific object. There are many advantages to a loose handshake. In particular, each side of the handshake need not understand details of the other side. The web page, for example, could request that a search occur. It need not understand whether a single or several modules react to the search. The server side could change the underlying search approach, add new search modules, and so forth, without having to notify the client. Thus, there is more flexibility. Furthermore, the loose approach enables a network of components to react to a request. For example, several parts of the tree can react to a search request and alter data flow. With a tight handshake, such reconfigurations become very complex and code intensive.

Figure 7:
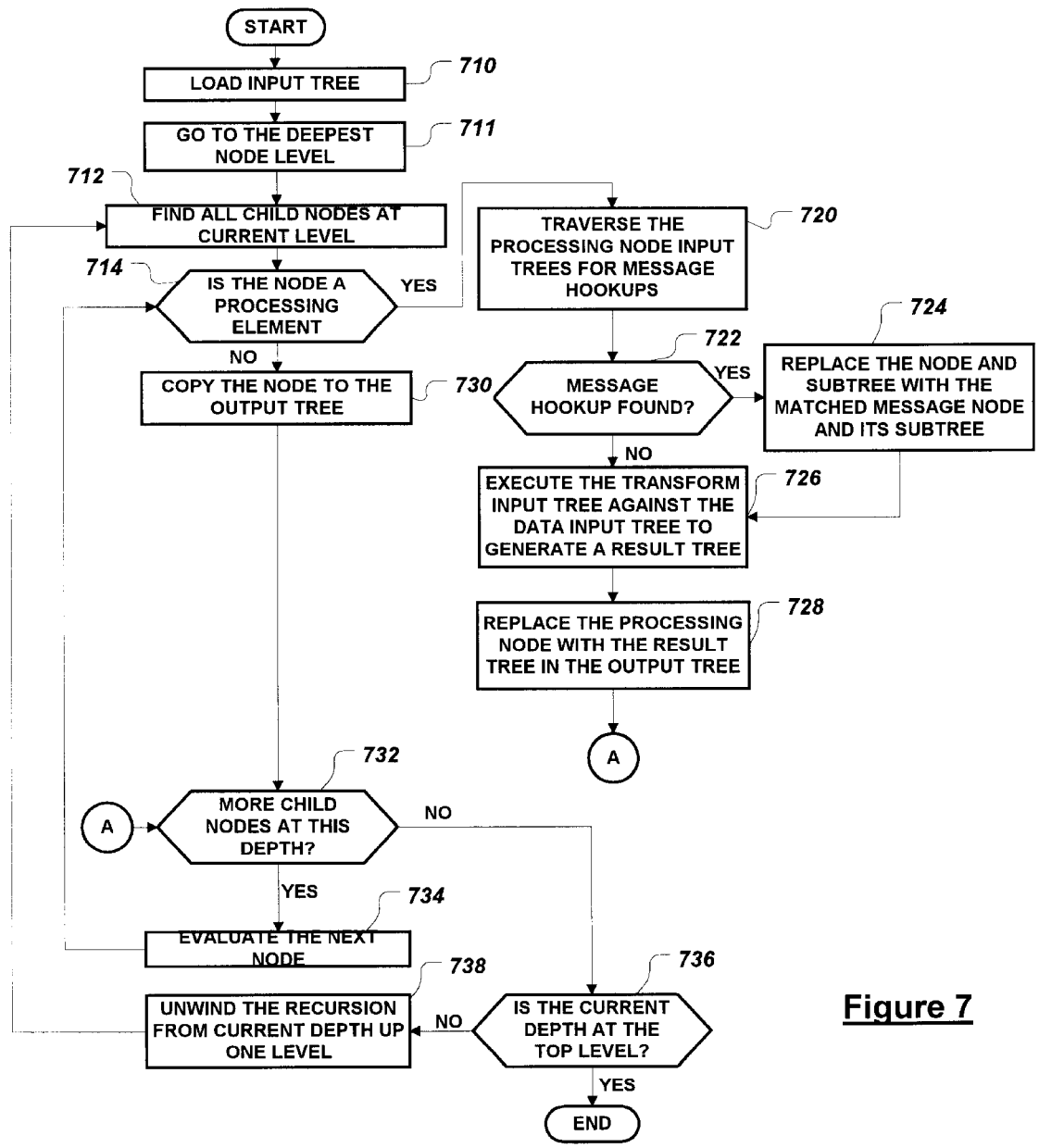
FIG. 7 is a flow diagram illustrating an exemplary process for evaluating an exemplary input tree according to an architecture of the invention.

FIG. 7 illustrates an exemplary execution process for an execution engine for processing a data flow architecture according to the invention. At step 710, the input tree is loaded by the execution engine. The process then proceeds to step 711, where the execution engine determines the deepest node level and then, at step 712, finds all of the child nodes at that current level. At step 714, the execution engine examines the first node at the current level and makes a determination as to whether or not the node is a processing element node. If not, the process, at step 730 copies the node to the output tree and proceeds to step 732 where a determination is made as to whether or not more child nodes exist at the current depth. If so, the process proceeds to step 734 to evaluate the next node and then branches back to step 714. If no more child nodes exist at the current depth, the execution engine unwinds the recursion to the next level up and branches to step 712.

If at step 714, the execution engine determines that the currently examined node is a processing node, the process branches to step 720 where the processing node's input trees, i.e., the data input tree and transformation input tree, are traversed to determine the presence of message hook-ups or message queries. If message queries are found at step 722, the process branches to step 724 where the data input node or transformation input node are replaced with the message tree corresponding to the matched message along with any subtrees. The process then branches to step 726, where the transformation input tree is executed against the data input tree to generate a result tree. If at step 722, no message hookups are found, the process bypasses step 724 and proceeds directly to step 726. After the result tree is generated at step 726, the processing node is replaced with the result tree at step 728 and the process continues to step 732.

At step 732, a determination is made as to whether or not more child nodes exist at the current depth of recursion. If not, the process branches to step 736 to determine whether or not the current depth is at the top level of the input tree, if so, the process terminates; if not, the process at step 738 unwinds the recursion from the current depth up one level and then branches to step 712 where all of the child nodes at the next higher level are found.

The invention also contemplates a caching system based on the above-described architecture. The declarative nature of the data tree, transformation tree, message tree and processing element output trees, provides for efficient dependency analysis on the architecture to determine which processing elements must be reevaluated upon a change in data, transformation input or messages. Specifically, after an architecture is evaluated for the first time, a cache may be provided for storing the evaluation of each individual processing element. Upon a change in data, messages, or transformation input, the reevaluation of particular processing elements can be controlled based on the dependency analysis, thus avoiding the unnecessary reevaluation of processing elements which have not changed.

As an example, consider the tree shown in FIG. 2A. The end result of executing the tree is an HTML file containing a table with two rows, as shown in FIG. 2C. Note that the first row depends upon data coming from "index.xml" and that the second row depends upon data coming from "bookinfo.xml." When executing this tree, the results of the first row can cached and the results of the second row can be cached. If the tree is reexecuted and "bookinfo.xml" and "index.xml" have not changed, and the transformation inputs have not changed, both rows can be retrieved from the cache. If "bookinfo.xml" has changed, the "bookinfo" processing element 220 is reevaluated and thus the associated row is recomputed. Yet, if "index.xml" has not changed, the associated row can be retrieved directly from the cache without performing any computations.

The caching features of the invention may be accomplished by various known techniques, for example those employed in spreadsheet dependency analysis. Because the dependencies between nodes are specified declaratively, a dependency structure may be built such that, given a particular node, the nodes dependent on that node may be indicated, That is, the nodes that would be affected by a change to a given node may be determined. For example, one could construct a tree where the tree contained one node for each processing entity node in the source tree, and where each of these nodes had a set of pointers to the other nodes in the tree affected by their changes and the current cached result of evaluating the node.

Under the above described dependency analysis, when a particular node is changed, the result of the entire tree may be regenerated according to the following general steps, for example: first, the node that has changed is found. Then, all of the nodes linked to the changed node are traversed recursively. During this traversal, each time a linked node is encountered, that linked node needs to be reevaluated rather than being retrieved from the cache and all of its dependent nodes then need to be reevaluated. In this manner, a change will cause updates to all of the nodes affected by the change, but not to any nodes not affected by the change. After all of the results that need to be reevaluated have been updated, the complete tree evaluation can be found by simply aggregating the current cached results from the tree.

The dependency of a particular node can be stored and caching controlled according to the stored dependencies. As will be recognized by those of ordinary skill, the invention contemplates more complex examples involving more levels of caching. Moreover, the invention contemplates caching based on changes that occur due to messages on the message bus. Such an approach is similar to the caching approach discussed above. A dependency tree is built that indicates what needs to be reevaluated every time there is a change. When an item changes on the message bus, the corresponding node is found in the dependency tree, and the items that need to be updated are updated.

Although the invention has been described above, it should be appreciated that a variety of modifications will be readily available to persons utilizing the invention. The foregoing description is not intended to be limiting, but is merely illustrative of an exemplary adaptation of the invention. Other products, apparatus and methods which incorporate modifications or changes to that which has been described herein are equally included within this application.

APPENDIX (Listing for "awardtemplate xml")

```
<data>
<table cellpadding="2" cellspacing="0" align="right" border="0">
<tr valign="top">
    <td width="15"></td>
    <td colspan="2" bgcolor="#006666">
    <font size="-1" color="#FFFFFF" face="arial, helvetica, sans-serif"><b>Awards</b></font></td>
</tr>
<tr valign="top">
    <td width="15"></td>
    <td colspan="2" bgcolor="#EEEECC"></td>
</tr>
<for-each src="award">
<tr valign="top">
    <td width="15"></td>
    <td width="10" bgcolor="#EEEECC"><img src="round4_subj.gif" alt="." width="4" height="4" hspace="3" vspace="6" border="0" /></td>
    <td width="100%" bgcolor="#EEEECC"><font size="-1" color="#000000" face="arial, helvetica, sans-serif"><a href="javascript:post('$(search)')"><data src="$(name)"/></a></font></td>
</tr>
</for-each>
<tr valign="top">
    <td width="15"></td>
    <td colspan="2" bgcolor="#EEEECC"></td>
</tr>
<tr valign="top">
    <td colspan="3"></td>
</tr>
</table>
</data>
```

APPENDIX-continued

Listing for "bind.xsl."

```
<transform>
<xst:template xmlns:xst="uri:xsl" xmlns:xsl="uri:foo">
    <xst:script>
        <![CDATA[
        function generateToken(szTok, blnFunction) {
        var szRes;
        if ((szTok == null) || (szTok == " ")){
            return" ";
        }
        //TODO: for demo purposes I'm finding the text value
        //of whatever gets passed in. But, really we should let
        //the object be passed in and change the item appropriately
        //for the built in functions that require text.
        if (blnFunction) {
            szRes = "this.selectSingleNode('" + szTok + "').text";
        }
        else {
            szRes = '<xsl:value-of select="' + szTok + '"/>';
        }
        return szRes;
    }
    function findMatch(szStr, nStart) {
        var nParen;
        var nLen;
        nParen = 1;
        nLen = szStr.length;
        for (i = nStart + 1; i < nLen; i++) {
            if (szStr.charAt(i) == "(") {
                nParen++;
            }
            else if (szStr.charAt(i) == ")") {
                nParen--;
                if (nParen == 0) {
                    return i;
                }
            }
        }
        return -1;
    }
    //Finds the next separating character, in this case a $
    //We'll use $$ to escape the $ character so that it can be used within strings
    //Could have tracked when we were in a string, but doing it this way allows us to
bind stuff
    //into string content
    function findNextSep(szStr, nStart) {
        var nOff;
        nOff = szStr.indexOf("$", nStart);
        while (nOff != -1) {
            //Is the next one a $ too?
            if (szStr.charAt(nOff+1) == "$") {
                //TODO: snarf one of the characters out of the string
                nOff = szStr.indexOf("$", n Off+2);
            }
            else
                return nOff;
        }
        return -1;
    }
    //Should have made this an LR parser; especially now that I need to recognize
XSL keywords
    function parseArgs(szStr, blnFunction) {
        var szRes = " ";
        var nDollar;
        var nParenOpen;
        var nParenClose;
        var nSeparator;
        var nStart = 0;
        //Walk through each token
        //Find the first $ in the string
        nDollar = findNextSep(szStr, nStart);
        //Copy all the stuff before the $
        szRes += szStr.substr(nStart,nDollar);
        while (nDollar != -1) {
            //Move ahead in the string
            nStart = nDollar;
            //Now find the (
            nParenOpen = szStr.indexOf("(", nStart);
            //Find the )
```

APPENDIX-continued

```
            nParenClose = findMatch(szStr, nParenOpen);
            //Make sure we have both
            if((nParenOpen == −1) || (nParenClose == −1)) {
                alert("malformed string" + szStr);
                return null;
            }
            //Do we have a function?
            if (nParenOpen > nStart + 1) {
                //If we are not in a function
                if (!blnFunction) {
                    //Add the first eval tag
                    szRes += "<xsl:eval>";
                }
                //If we are in a function already, just emit the function name
szRes += szStr.substr(nStart+1, nParenOpen − nStart);
szRes += parseArgs(szStr.substr(nParenOpen + 1,
nParenClose − nParenOpen − 1), true);
                //Now add the ending )
                szRes += ")";
                if (!blnFunction) {
                    szRes += "</xsl:eval>"
                }
            }
            else {
                //Generate the token
                szRes += generateToken(szStr.substr(nParenOpen +
1, nParenClose − nParenOpen − 1), blnFunction);
                //Walk beyond the ending )
            }
            nStart = nParenClose + 1;
            nDollar = findNextSep(szStr, nStart);
            //Copy all the stuff in the middle
            szRes += szStr.substr(nStart, nDollar − nStart);
        }
        //Copy the rest
        szRes += szStr.substr(nStart);
        return szRes;
    }
    function parse(str, flag) {
        return parseArgs(str.nodeValue,flag);
    }
    function strip(str) {
        return str.nodeValue.substr(1);
    }
]]>
</xst:script>
<xsl:template><xst:attribute name="xmlns:xsl">uri:xsl</xst:attribute>
<xsl:script>
<![CDATA[
function discount(ret, disc) {
    nRet = ret;
    nDisc = disc;
    res = formatNumber(nRet − nDisc, "$#.00") + " " + formatNumber((nRet−nDisc)/nRet,"(##%)");
    return res;
}
]]>
</xsl:script>
<xst:apply-templates select="*"/>
</xsl:template>
<xst:define-template-set>
    <xst:template match="*">
        <xst:copy>
            <xst:apply-templates select="@*"/>
            <xst:apply-templates/>
        </xst:copy>
    </xst:template>
    <xsl:template match = "textnode( )">
        <xsl:value-of/>
    </xsl:template>
    <xsl:template match = "cdata( )">
        <xsl:value-of/>
    </xsl:template>
    <xst:template match="@*">
        <xsl:attribute><xst:attribute name="name"><xst:node-name/></xst:attribute>
        <xst:eval no-entities="t">parse(this,false) </xst:eval></xsl:attribute>
    </xst:template>
```

APPENDIX-continued

```
<xst:template match="data">
        <xst:for-each select="@src">
            <xst:eval no-entities="t">parse(this,false) </xst: eval>
        </xst:for-each>
        <xst:apply-templates/>
    </xst:template>
        <xst:template match="for-each">
            <xsl:for-each>
                <xst:attribute     name="select"><xst: value-of select="@src"/></xst:attribute>
                <xst:apply-templates/>
            </xsl:for-each>
        </xst:template>
    </xst:define-template-set>
</xst:template>
</transform>
```

What is claimed is:

1. A self-modifying data flow execution architecture comprising:
   at least first and second processing elements;
   the first processing element having a first data input and a first transformation input and generating a first output by applying a transformation represented by the first transformation input to the data represented by the first data input;
   the second processing element having a second data input and a second transformation input and generating a second output;
   the first output being provided as one of the second data input or the second transformation input; and
   a message bus that provides message content to the first processing element and the second processing element, wherein the message content conditionally alters at least one input.

2. The architecture of claim 1, wherein the first and second processing elements are defined within an XML tree.

3. The architecture of claim 2, wherein the first output is provided as one of the second data input or the second transformation input by nesting the first processing element within an XML tree representing the second processing element.

4. The architecture of claim 1, wherein the first and second processing elements are defined by processing element tags in a markup language tree.

5. The architecture of claim 4, wherein the transformation inputs and data inputs are designated by respective tags in the markup language tree.

6. The architecture of claim 1, further comprising a message bus for conveying message information to the first and second processing elements.

7. The architecture of claim 6, wherein at least one of the first and second processing elements are provided with message queries for querying the message bus.

8. The architecture of claim 1, wherein the architecture is defined by a markup language input tree, the input tree including a first processing element node, represented by a first processing element tree containing a first transformation input node represented by a first transformation input tree and a first data input node represented by a first data input tree, and a second processing element node, represented by a second processing element tree containing a second transformation input node represented by a second transformation input tree and a second data input node represented by a second data input tree.

9. The architecture of claim 8, wherein the markup language tree is an XML tree.

10. The architecture of claim 9, wherein the transformation input trees are XSL trees.

11. A self-modifying data flow execution architecture of claim 1, further comprising:
    a cache that stores an evaluation of each processing element and determines whether each said processing element requires re-evaluation if an input or the message content changes.

12. A method of processing data, the method comprising the steps of:
    providing a first processing element having a first data input for receiving a first data input tree and a first transformation input for receiving a first transformation input tree;
    providing a second processing element having a second data input for receiving a second data input tree and a second transformation input for receiving a second transformation input tree;
    generating a first output tree by applying the first transformation input tree to the first data input tree;
    providing the first output tree to the second processing element as one of the second data input tree or the second transformation input tree;
    generating a second output tree by applying the second transformation input tree to the second data input tree;
    receiving message content on a message bus; and
    conditionally altering at least one input based on the message content.

13. The method of claim 12, wherein the step of providing a first processing element further comprises the step of providing a first XML input tree structure.

14. The method of claim 13, wherein the step of providing a second processing element further comprises the step of providing a second XML input tree structure containing the first XML input tree structure.

15. The method of claim 14, wherein the first XML input tree structure is contained within a transformation input node of the second XML input tree structure to provide for the first output of the first processing element being the second transformation input of the second processing element.

16. The method of claim 12, comprising the further step of providing a message bus input for each of the first processing element and the second processing element.

17. The method of claim 16, wherein the step of providing a message bus input comprises the step of providing a message query within each of the first processing element and the second processing element.

18. The method of claim 12, wherein the first transformation input tree is structured as an XSL tree.

19. The method of claim 12, wherein the first data input tree is structured as an XML tree.

20. A computer-readable medium having computer-executable instructions for performing the steps comprising:

providing a first processing element having a first data input for receiving a first data input tree and a first transformation input for receiving a first transformation input tree;

providing a second processing element having a second data input for receiving a second data input tree and a second transformation input for receiving a second transformation input tree;

generating a first output tree by applying the first transformation input tree to the first data input tree;

providing the first output tree to the second processing element as one of the second data input tree or the second transformation input tree;

generating a second output tree by applying the second transformation input tree to the second data input tree;

receiving message content on a message bus; and conditionally altering at least one input based on the message content.

21. The computer-readable medium of claim 20, wherein the step of providing a first processing element further comprises the step of providing a first XML input tree structure.

22. The computer-readable medium of claim 21, wherein the step of providing a second processing element further comprises the step of providing a second XML input tree structure containing the first XML input tree structure.

23. The computer-readable medium of claim 22, wherein the first XML input tree structure is contained within a transformation input node of the second XML input tree structure to provide for the first output of the first processing element being the second transformation input of the second processing element.

24. The computer-readable medium of claim 20, comprising the further step of providing a message bus input for each of the first processing element and the second processing element.

25. The computer-readable medium of claim 24, wherein the step of providing a message bus input comprises the step of providing a message query within each of the first processing element and the second processing element.

26. The computer-readable medium of claim 20, wherein the first transformation input tree is structured as an XSL tree.

27. The computer-readable medium of claim 20, wherein the first data input tree is structured as an XML tree.

28. A method of processing an input tree structure having defined therein at least one processing element node, the method comprising the steps of:

determining nodes of the input tree structure;

determining whether a particular one of the nodes is a processing element and upon so determining, executing a transform input tree associated with the processing element against a data input tree associated with the processing element to generate a result tree;

reevaluating the processing element in response to a change in data, transformation input, or messages; and copying the result tree into an output tree.

29. The method of claim 28, further comprising the step of determining whether the particular one of the nodes contains a message hookup and upon so determining, replacing the node with a node associated with a matched message.

30. The method of claim 29, farther comprising the step of determining the deepest node level in the input tree before the step of determining whether a particular one of the nodes is a processing element.

31. The method of claim 29, wherein the step of determining nodes further comprises the step of evaluating the nodes of the structure using a depth first traversal.

32. The method of claim 29, wherein the step of determining whether a particular one of the nodes is a processing element further comprises the step of evaluating a processing element tag within the input tree structure.

33. The method of claim 29, wherein the step of executing a transform input tree further comprises the step of evaluating another processing element.

34. The method of claim 29, wherein the step of executing a transform input tree associated with the processing element against a data input tree further comprises providing another processing element as the data input tree.

* * * * *